United States Patent
Chen (10) Patent No.: US 10,031,639 B2
(45) Date of Patent: Jul. 24, 2018

(54) RECOGNIZABLE IDENTIFICATION OF A NETWORK DEVICE

(71) Applicant: ARRIS Enterprises, Inc., Suwanee, GA (US)

(72) Inventor: Shi Jin Chen, Alpharetta, GA (US)

(73) Assignee: ARRIS Enterprises LLC, Suwanee, GA (US)

( * ) Notice: Subject to any disclaimer, the term of this patent is extended or adjusted under 35 U.S.C. 154(b) by 484 days.

(21) Appl. No.: 14/633,850

(22) Filed: Feb. 27, 2015

(65) Prior Publication Data
US 2015/0242066 A1 Aug. 27, 2015

Related U.S. Application Data

(60) Provisional application No. 61/945,261, filed on Feb. 27, 2014.

(51) Int. Cl.
| | |
|---|---|
| *G06F 3/0481* | (2013.01) |
| *H04L 29/08* | (2006.01) |
| *H04L 29/06* | (2006.01) |
| *H04L 12/24* | (2006.01) |

(52) U.S. Cl.
CPC ........ *G06F 3/0481* (2013.01); *H04L 41/0806* (2013.01); *H04L 41/0856* (2013.01); *H04L 67/1097* (2013.01); *H04L 67/42* (2013.01)

(58) Field of Classification Search
CPC .................................................. G06F 3/0481
See application file for complete search history.

(56) References Cited

U.S. PATENT DOCUMENTS

| | | | | |
|---|---|---|---|---|
| 6,823,454 B1* | 11/2004 | Hind | ................. | H04L 29/12066 713/168 |
| 2005/0243739 A1 | 11/2005 | Anderson et al. | | |
| 2009/0001173 A1* | 1/2009 | Sevier | ................ | G06K 7/10851 235/462.41 |
| 2009/0240814 A1* | 9/2009 | Brubacher | .............. | H04W 8/18 709/227 |
| 2011/0055928 A1* | 3/2011 | Brindza | ................ | H04W 12/08 726/26 |
| 2013/0096649 A1* | 4/2013 | Martin | ................. | G06F 19/322 607/60 |
| 2014/0016585 A1* | 1/2014 | Lo | ..................... | H04W 72/0486 370/329 |

(Continued)

FOREIGN PATENT DOCUMENTS

EP 0751648 A2 1/1997

OTHER PUBLICATIONS

PCT Search Report & Written Opinion, RE: Application No. PCT/US2015/018063, dated Jun. 15, 2015.

*Primary Examiner* — David Choi
(74) *Attorney, Agent, or Firm* — Bart A. Perkins (57) ABSTRACT

Methods, systems, and computer readable media can be operable to facilitate an association between a recognizable identifier and a client device connecting to a central device. Identification information associated with a client device may be received at a central device within a request for configuration parameters. The identification information may be used to retrieve a recognizable identifier associated with the client device. In embodiments, the client device may be identified within a display using the associated recognizable identifier.

20 Claims, 5 Drawing Sheets

(56) References Cited

U.S. PATENT DOCUMENTS

| | | | |
|---|---|---|---|
| 2014/0359089 A1* | 12/2014 | Davis | G06F 15/177 709/221 |
| 2015/0065049 A1* | 3/2015 | Heo | H04B 7/2612 455/41.2 |
| 2015/0242066 A1* | 8/2015 | Chen | G06F 3/0481 715/738 |
| 2016/0055758 A1* | 2/2016 | Francis | G06F 19/3431 434/236 |

* cited by examiner

RECOGNIZABLE IDENTIFICATION OF A NETWORK DEVICE

CROSS REFERENCE TO RELATED APPLICATION

This application is a non-provisional application claiming the benefit of U.S. Provisional Application Ser. No. 61/945,261, entitled "Identifying a Device Connected to Node," which was filed on Feb. 27, 2014, and is incorporated herein by reference in its entirety.

TECHNICAL FIELD

This disclosure relates to identifying a client device connected to a central device.

BACKGROUND

Local area networks, such as premise and home networks, continue to grow in size and functionality, and a growing number of devices may be connected to a local network. For example, subscribers may receive multiple services at any of a plurality of devices configured to receive the services. A single local network might provide multiple services and can facilitate communications between various devices including, but not limited to, computers, televisions, mobile devices, tablets, televisions, set-top boxes, gaming consoles, and other devices such as Internet of things (IoT) devices.

In some instances, information associated with a local area network may be gathered and displayed to a consumer of the information. For example, a subscriber, technician, service-provider, or other entity might request a display of information detailing the organization, status, and/or health of a local area network and the devices connected to the network. However, the generated display of network information typically identifies devices connected to the network using a numeric or alpha-numeric identifier (e.g., serial number, manufacturer identifier, etc.) associated with the various devices, and consumers of the displayed information are generally unable to associate the identifier with a specific device. Considering the growing number of devices that may be connected to a network, a consumer of the displayed information may not be able to identify a specific device and corresponding status or health information based upon this numeric or alpha-numeric identifier. Therefore, a need exists for improved methods and systems for associating devices connected to a network with unique and recognizable identifiers for use in generating a display.

BRIEF DESCRIPTION OF DRAWINGS

Like reference numbers and designations in the various drawings indicate like elements.

DETAILED DESCRIPTION

It is desirable to improve upon methods and systems for associating devices with recognizable identifiers. The methods, systems, and computer readable media described herein can be operable to facilitate an association between a recognizable identifier and a client device connecting to a central device. Identification information associated with a client device may be received at a central device within a request for configuration parameters. The identification information may be used to retrieve a recognizable identifier associated with the client device. In embodiments, the client device may be identified within a display using the associated recognizable identifier.

In embodiments, a client device can output a recognizable identifier (e.g., device type, unique device name, media access control (MAC) address, etc.) to a central device, the central device may map identification information to a recognizable identifier, or a recognizable identifier may be manually input into the central device. The central device can associate the recognizable identifier with the client device, and can then refer to the client device using the recognizable identifier.

Figure 1:
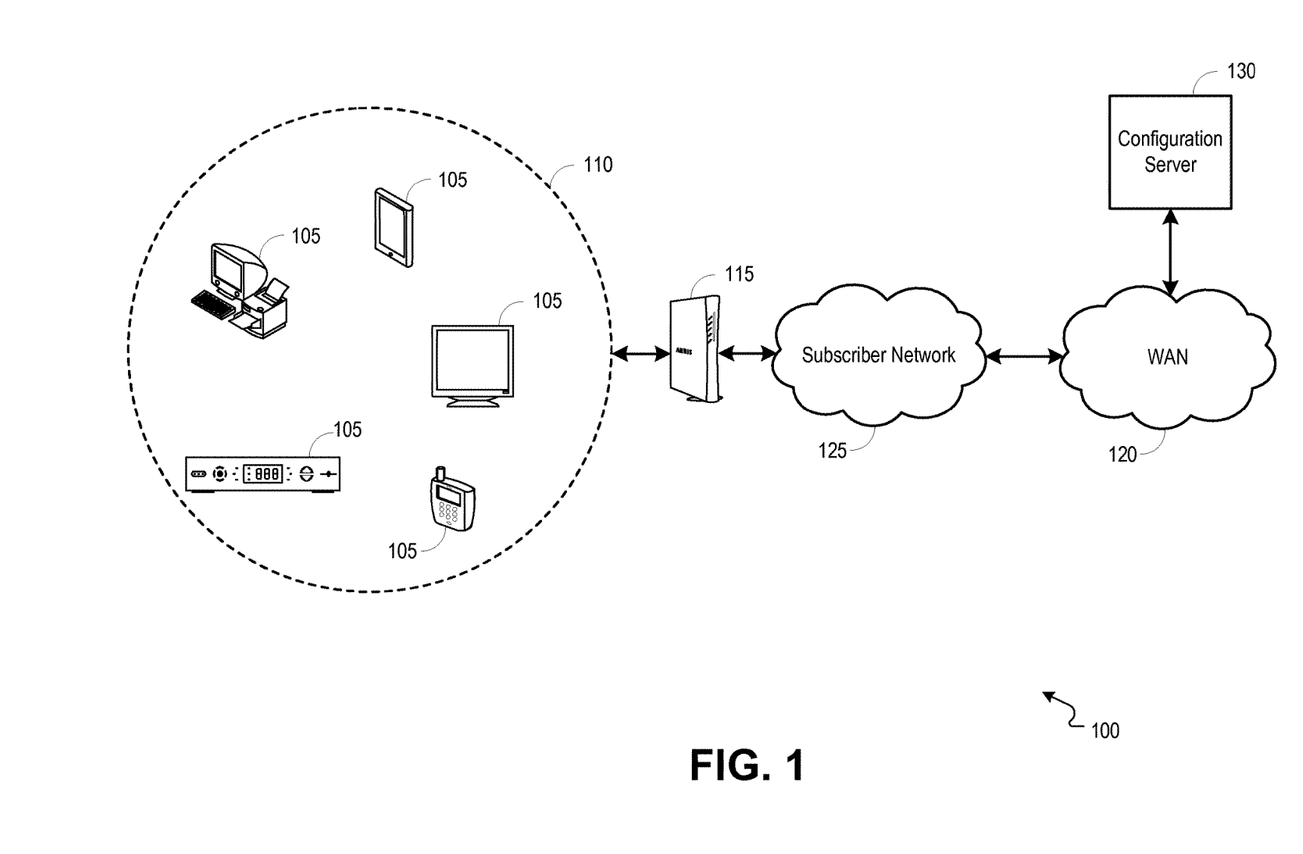
FIG. 1 is a block diagram illustrating an example network environment operable to facilitate the identification of a client device associated with a central device.

FIG. 1 is a block diagram illustrating an example network environment 100 operable to facilitate the identification of a device associated with a central device. In embodiments, video, voice, and/or data services may be delivered to one or more client devices 105. Client devices 105 may include a television, mobile device, tablet, computer, set-top box (STB), gaming device, device provided by a service provider (e.g., customer premise equipment (CPE) device) and any other device operable to receive video, voice, and/or data services. Client devices 105 may also include devices that are configured to communicate over a local network (e.g., IoT devices). It should be understood that the devices shown in FIG. 1 may be integrated. For example, a television may be connected to and controlled by a STB.

Multiple services may be delivered to client devices 105 over a local network 110. The local network 110 may include a local area network (LAN), wireless local area network (WLAN), personal area network (PAN), mobile hotspot network, and others. The local network 110 may be provided at a subscriber premise by a central device 115. The central device 115 may route communications to and from the one or more client devices 105 and may include a gateway device, modem device, a wireless router including an embedded cable modem, a digital subscriber line (DSL) modem, a mobile hot-spot router, a multimedia over coaxial alliance (MoCA) node, some combination thereof, and any other device that is operable to route communications to and from a client device 105. It will be appreciated by those skilled in the relevant art that delivery of the multiple services over the local network 110 may be accomplished using a variety of techniques, standards and formats.

In embodiments, multiple services (e.g., video, voice, and/or data services) may be delivered from a wide-area network (WAN) 120 to the local network 110 through a connection to a subscriber network 125. The subscriber network 125 may include an optical network, hybrid fiber coaxial (HFC) network, twisted-pair, mobile network, high-speed data network, and others. Multiple systems operator (MSO) devices and/or networks within the WAN 120 may be used to provide, manage, and/or troubleshoot the multiple services provided to subscribers. For example, a configuration server 130 (e.g., Dynamic Host Configuration Protocol (DHCP) server, etc.) may provide network configuration parameters (e.g., Internet protocol (IP) address, lease time, signal routing information, designated network nodes, domain server information, and other configuration parameters) to a central device 115 and/or client devices 105. An upstream configuration server 130 may provide configuration information to client devices 105 attempting to join a hotspot network provided by a central device 115. In embodiments, a configuration server (e.g., DHCP server, etc.) may reside locally within a central device 115. For example, the configuration server residing at a central device 115 may be configured to provide network configuration parameters to devices (e.g., client devices 105) connecting to the central device 115.

It will be appreciated by those skilled in the relevant art that client devices 105 may be capable of interacting and communicating with each other and/or with a central device 115 over various wireless communication standards (e.g., Wi-Fi, Bluetooth, etc.) or wired communication standards (e.g., Ethernet, MoCA, etc.). For example, the central device 115 may route communications between connected client devices 105.

In embodiments, a client device 105 may be configured to provide a subscriber with an interface for monitoring and/or managing devices connected to a local network 110 and/or central device 115. For example, a subscriber can access an application through a client device 105, wherein the subscriber can view the devices associated with a local network 110 and/or central device 115, and the subscriber can view and modify various settings and configurations associated with the devices. It will be appreciated by those skilled in the relevant art that an interface (e.g., graphical user interface (GUI)) may be provided for a variety of purposes including, but not limited to viewing/configuring security settings for devices connected to a local network/central device, viewing/modifying configuration parameters for devices connected to a local network/central device, viewing an overview of the devices connected to a local network/central device, viewing status information associated with a local network, central device, and/or devices connected to the local network/central device.

The central device 115 may store or otherwise access information associated with client devices 105 that are connected to the local network 110 or to the central device 115. It should be understood that the information associated with client devices 105 may be located at a network back office (e.g., server or application connected to the WAN 120 such as the configuration server 130), or may be located within a subscriber premise (e.g., server or application connected to the local network 110, configuration server residing in a central device 115, etc.).

In embodiments, when a client device 105 connects to a central device 115, the client device 105 can provide the central device 115 with information identifying the client device 105. For example, a client device 105 can include identification information within a request to join the central device 115 or a request for configuration parameters (e.g., within a configuration parameter request such as a DHCP request). In embodiments, the identification information can include a recognizable identifier (e.g., any information serving to provide an immediate recognition of the client device 105) associated with the client device 105. For example, a recognizable identifier may include information identifying the type of client device (e.g., name of manufacturer, product or model name, etc.), a unique title or name associated with the client device (e.g., a subscriber created name such as "Subscriber's Tablet"), and other information serving to identify the client device (e.g., MAC address). A field may be included within a request for configuration parameters (e.g., configuration parameter request such as a DHCP request), wherein the field includes an identification of a device type associated with the client device 105 from which the request is received. It will be appreciated by those skilled in the relevant art that a client device 105 may be connected to and communicate with a central device 115 using various techniques and standards. (e.g., Wi-Fi, MoCA, Ethernet, etc.).

In embodiments, when a client device 105 is connected to a central device 115, the client device 105 may identify itself to the central device 115 using a preset numeric or alpha-numeric identifier (e.g., manufacturer's serial number, media access control (MAC) address, etc.). The preset numeric or alpha-numeric identifier may not be immediately recognizable to allow a user to identify the client device 105. The central device 115 may access a table or map, wherein a numeric or alpha-numeric identifier may be mapped to other identification information (e.g., recognizable identifier such as a device type) associated with the connected client device 105. For example, the table or map may be accessed at a database within the central device 115 or from an external server such as a manufacturer's server wherein manufacturer serial numbers may be mapped to associated device types. In embodiments, a user may manually enter immediately recognizable identification information associated with a connected client device 105 into a database that may be accessed by a central device 115. It should be understood that there are various techniques and various sources through which a central device 115 may associate a connected client device 105 with immediately recognizable identification information.

In embodiments, the central device 115 can maintain a list of client devices 105 that are connected to the central device 115. For example, the central device 115 can periodically request connection updates from client devices 105 or can receive notification when a client device 105 joins the local network 110. It will be appreciated by those skilled in the relevant art that the central device 115 can use various communication techniques and methods to maintain a current list of client devices and corresponding status information.

In embodiments, the central device 115 can maintain configuration information associated with each of the one or more client devices 105 that are connected to the central device 115. For example, the configuration information can include information such as, network parameters (e.g., IP address, lease time, designated network nodes, domain server information, etc.), services that a client device 105 is provisioned to receive, security settings associated with a client device 105 (e.g., whether the client device is blocked from receiving a service), and other information associated with the one or more client devices 105.

In embodiments, information associated with client devices 105 connected to a central device 115 may be stored within a table, wherein the table includes a plurality of data fields for storing information associated with each client device 105. For example, the table may include fields for storing configuration information, security settings, network parameter information, and/or identification information. One such field may be a device type field. The table may reside within a central device 115 or at an external server (e.g., configuration server 130). Information to populate the device type field may be retrieved by the central device 115 from a connecting client device 105 (e.g., from within a message received from the client device 105), from an upstream server (e.g., manufacturer server), from user-input entered manually into the central device 115, or other source.

In embodiments, the central device 115 can generate and output a list of one or more client devices 105 that are associated with the central device 115. For example, the central device 115 can output a list of one or more client devices 105 that are or previously have been connected to the central device 115, the list being output to a display device or client device 105. The list of one or more client devices 105 may be generated in response to a user-request for viewing/modifying device security settings, for viewing/modifying network parameters, for viewing a status of the devices, for viewing an overview of the devices connected to the central device 115, and/or for any other reason requiring output of a list of devices connected to the central device 115. The requesting user may be a subscriber, technician, service-provider, or others, and the request may come from a client device 105 connected to the central device 115 or from an upstream network element (e.g., service provider retrieving information from the central device 115 through an upstream network element). The generated list may be output to one or more client devices 105 through a wired or wireless connection and/or the list may be communicated to an upstream element (e.g., using simple network management protocol (SNMP), TR-069 message, etc.).

In embodiments, one or more client devices 105 that are connected to the central device 115 may be presented/identified within a displayed list according to the identification information (e.g., immediately recognizable identification information) associated with each of the client devices 105. For example, the one or more client devices 105 may be identified within the list by displaying a recognizable identifier such as the associated device type, a unique name or title associated with the client device 105, MAC address associated with the client device 105, or other identification information associated with the client device 105.

In embodiments, the list of devices connected to a central device 115 may be accessed by a user to configure settings (e.g., security settings, network parameters, etc.) associated with each of the client devices 105 or to view device status or overview using a GUI that is output at a display device. The GUI may be output at a display device connected to the central device 115 or a client device 105.

Figure 2:
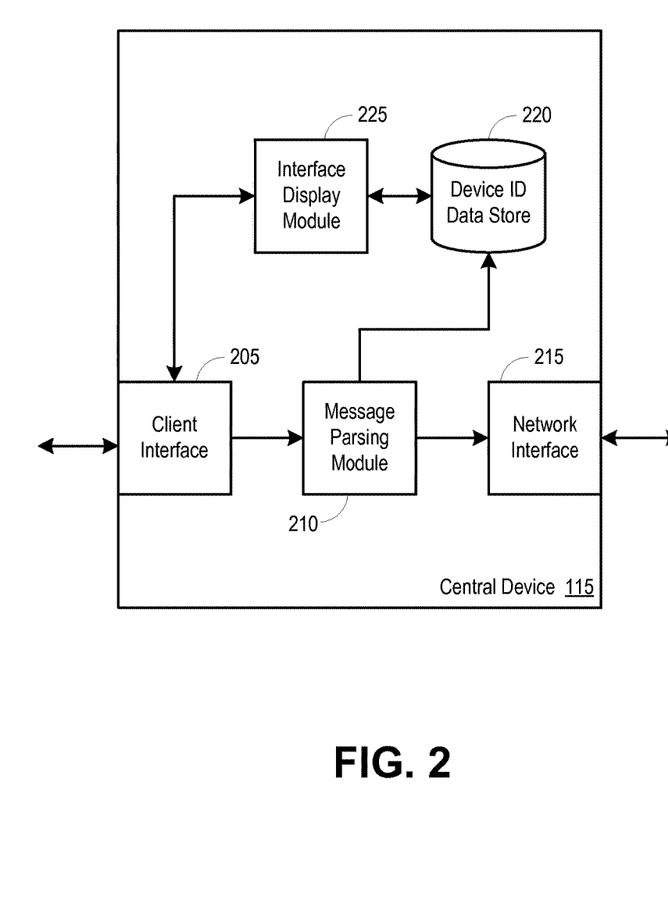
FIG. 2 is a block diagram illustrating an example central device operable to facilitate the identification of a client device associated with the central device.

FIG. 2 is a block diagram illustrating an example central device 115 operable to facilitate the identification of a device associated with the central device 115. In embodiments, a central device 115 may include a client interface 205, a message parsing module 210, a network interface 215, a device identification data store 220, and an interface display module 225.

A central device 115 may receive communications from one or more client devices 105 of FIG. 1 through the client interface 205. In embodiments, when a client device 105 connects to a central device 115, the client device 105 can provide the central device 115 with information identifying the client device 105. For example, a client device 105 can include identification information within a request to join the central device 115 or request for configuration parameters (e.g., within a DHCP request or other request for configuration parameters). In embodiments, the identification information can include immediately recognizable identification information (e.g., a recognizable identifier) such as information identifying the type of client device 105, a unique title or name associated with the client device 105, or any other information serving to identify the client device 105. It should be understood that the client interface 205 may support wireless communications (e.g., Wi-Fi) and/or wired communications (e.g., Ethernet, MoCA, etc.). It should be understood that identification information associated with a client device 105 may be delivered to a central device 115 within a variety of communication types and at various times. For example, a client device 105 may output identification information to a central device 115 during or subsequent to establishing a connection with a central device, or the central device 115 may query identification information from the client device 105 during or after the establishment of a connection between the client device 105 and central device 115 (e.g., the central device 115 may request identification information from the client device 105 when the central device 115 needs a recognizable identifier associated with the client device 105).

In embodiments, the message parsing module 210 may parse a message received from a client device 105 of FIG. 1 through the client interface 205. The message (e.g., configuration parameter request such as a DHCP request) may include identification information identifying the client device 105 from which the message is received. The message parsing module 210 may retrieve the identification information from the message and output the message to an upstream destination (e.g., configuration server 130 of FIG. 1) through the network interface 215. The identification information may include a recognizable identifier associated with the client device 105. For example, the message parsing module 210 may retrieve a device type identifier from a designated field within a DHCP request.

In embodiments, identification information retrieved by the message parsing module 210 may be stored at the device identification data store 220. Identification information associated with client devices 105 that have been and/or currently are connected to the central device 115 may be stored at the device identification data store 220. Identification information may include a recognizable identifier such as a device type (e.g., functional descriptor of the device, manufacturer or brand of device, model number of device, etc.), a unique title or name associated with a device, or any other information serving to identify a device.

In embodiments, when a client device 105 is connected to the central device 115, the client device 105 may identify itself to the central device 115 using a preset numeric or alpha-numeric identifier (e.g., manufacturer's serial number, media access control (MAC) address, etc.). The preset numeric or alpha-numeric identifier may not be immediately recognizable to allow a user to identify the client device 105. The central device 115 may access a table or map, wherein a numeric or alpha-numeric identifier may be mapped to other identification information (e.g., recognizable identifier such as device type) associated with the connected client device 105, and the other identification information may be stored within the device identification data store 220. For example, the table or map may be accessed at a database within the central device 115 or from an external server such as a manufacturer's server wherein manufacturer serial numbers may be mapped to associated device types. In embodiments, a user may manually enter immediately recognizable identification information associated with a connected client device 105 into the central device 115, and the input information may be stored at the device identification data store 220. It should be understood that there are various techniques and various sources through which a central device 115 may associate a connected client device 105 with immediately recognizable identification information.

An interface display module 225 may generate a display or interface (e.g., GUI), wherein the display or interface includes one or more descriptors for each of one or more devices that have been and/or that currently are connected to the central device 115. The one or more descriptors for each device may include immediately recognizable identification information retrieved from a message (e.g., configuration parameter request such as a DHCP request) received from the respective device, received from mapping at a local or an upstream server (e.g., device manufacturer's server), or manually input into the central device 115 by a user. In embodiments, the interface display module 225 may generate and output a message to a display device or client device 105 through the client interface 205, and the message may be used to generate a display (e.g., GUI) showing each device associated with the central device 115, wherein each device is identified within the display according to the immediately recognizable identification information associated with each respective device. The message may be output through the network interface 215 to an upstream network element (e.g., service provider server).

In embodiments, the list of one or more client devices 105 may be generated in response to a user-request for viewing/modifying device security settings, for viewing/modifying network parameters, for viewing a status of the devices, for viewing an overview of the devices connected to the central device 115, and/or for any other reason requiring output of a list of devices connected to the central device 115. The interface display module 225 may retrieve configuration information, network parameters, status information, and other information associated with client devices 105 from a database within the central device 115 or a database outside of the central device 115. It should be understood that the database including information associated with the client devices 105 may be integrated with the device identification data store 220.

Figure 3:
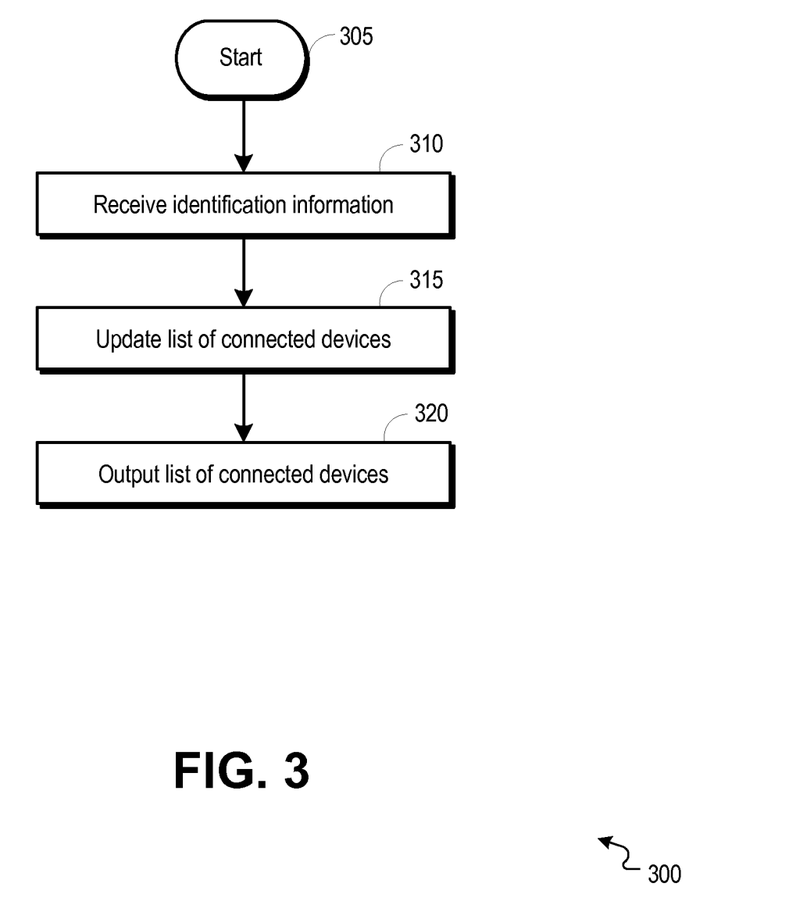
FIG. 3 is a flowchart illustrating an example process operable to facilitate the identification of a client device associated with a central device.

FIG. 3 is a flowchart illustrating an example process 300 operable to facilitate the identification of a device associated with a central device. The process 300 can start at 305 when a client device 105 is connected to a central device 115. It should be understood that the connection between a client device 105 and central device 115 may be wired or wireless.

At 310, a central device can receive identification information associated with a client device. In embodiments, when a client device 105 of FIG. 1 connects to a central device 115 of FIG. 1, the client device 105 can provide the central device 115 with information identifying the client device 105. For example, a client device 105 can include identification information within a request to join the central device 115 or request for configuration parameters (e.g., within a DHCP request or other request for configuration parameters). In embodiments, the identification information can include immediately recognizable identification information such as information identifying the type of client device 105, a unique title or name associated with the client device 105, and/or other information serving to identify the client device 105.

In embodiments, when a client device 105 is connected to a central device 115, the client device 105 may identify itself to the central device 115 using a preset numeric or alpha-numeric identifier (e.g., manufacturer's serial number, media access control (MAC) address, etc.). The preset numeric or alpha-numeric identifier may not be immediately recognizable to allow a user to identify the client device 105. The central device 115 may access a table or map, wherein a numeric or alpha-numeric identifier may be mapped to other identification information (e.g., recognizable identifier such as device type) associated with the connected client device 105. For example, the table or map may be accessed at a database within the central device 115 or from an external server such as a manufacturer's server wherein manufacturer serial numbers may be mapped to associated device types. In embodiments, a user may manually enter immediately recognizable identification information associated with a connected client device 105 into a database that may be accessed by a central device 115. It should be understood that there are various techniques and various sources through which a central device 115 may associate a connected client device 105 with immediately recognizable identification information.

At 315, a list of client devices connected to the central device can be updated. In embodiments, the central device 115 can maintain a list of one or more client devices 105 that are connected to the central device 115. In embodiments, when a client device 105 connects to a central device 115, the central device 115 can add the client device 105 to a list of one or more client devices connected to the central device 115. For example, the central device 115 can add the identification information (e.g., immediately recognizable identification information) associated with the client device 105 to storage that includes identification information associated with each of one or more client devices connected to the central device 115.

At 320, the central device can output a list of client devices connected to the central device. In embodiments, the central device 115 can output the list of client devices 105 that are associated with the central device 115 in response to a request for information about the devices connected to the central device (e.g., security or configuration information, network parameters, device status, network overview, etc.). The list can be output to a requesting user or device and can be displayed at a display device (e.g., as a GUI). In embodiments, each client device 105 may be identified within the displayed list using a recognizable identifier (e.g., immediately recognizable identification information) associated with each of the one or more client devices 105. For example, the recognizable identifier for a client device 105 can be a description of the type of client device 105, a unique title or name associated with the client device 105, and/or other information serving to identify the client device 105 that is included in the identification information associated with the client device.

Figure 4:
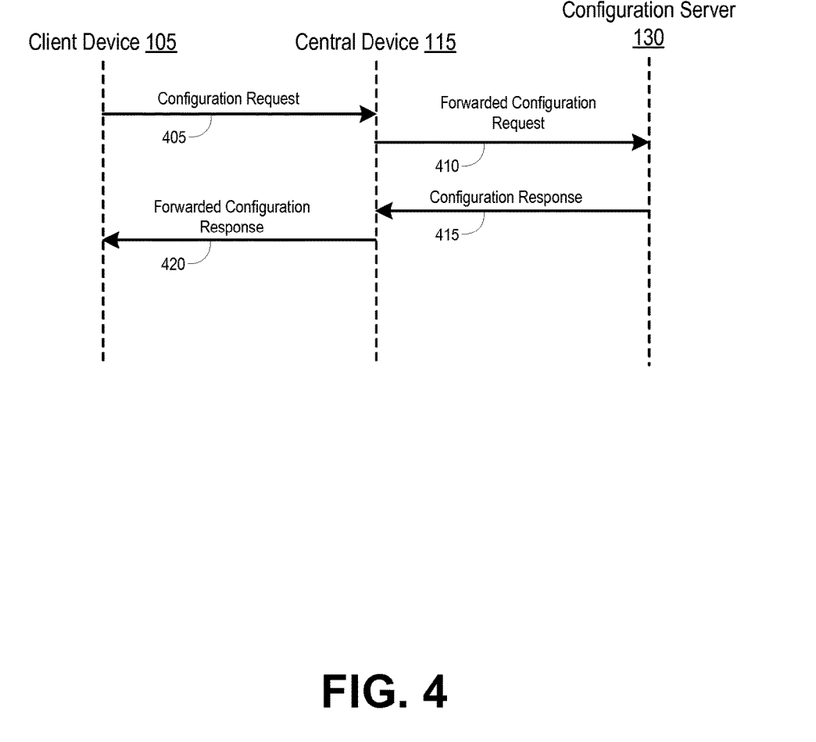
FIG. 4 is a transition diagram showing communications operable to facilitate the identification of a client device associated with a central device.

FIG. 4 is a transition diagram showing communications operable to facilitate the identification of a device associated with a central device. In embodiments, when a client device 105 is connected to a central device 115, the client device 105 can generate and output a configuration request 405 (e.g., DHCP request) to the central device 115. Identification information associated with the client device 105 may be included within the configuration request 405. The identification information may include one or more recognizable identifiers such as information identifying the type of client device 105, a unique title or name associated with the client device 105, and/or other information serving to identify the client device 105. For example, the client device 105 may be configured with immediately recognizable identification information (e.g., device type, unique name, MAC address, etc.), and the client device 105 may populate a field within the configuration request 405 with the immediately recognizable identification information.

In embodiments, the central device 115 may parse the configuration request 405 and retrieve identification information from the configuration request 405. The central device 115 may store the identification information in a database including a list of devices connected to the central device 115 and may associate the identification information with the client device 105 from which the configuration request 405 is received. The central device 115 can then package and output the configuration request to an upstream server (e.g., as a forwarded configuration request 410). For example, the central device 115 can output a forwarded configuration request 410 to a configuration server 130.

The central device 115 may receive a configuration response 415 (e.g., DHCP response) from the configuration server 130. The configuration response 415 may include network configuration parameters (e.g., Internet protocol (IP) address, lease time, designated network nodes, domain server information, etc.) associated with the client device 105 from which the configuration request 405 is received. In embodiments, the central device 115 may parse the configuration response 415 and retrieve configuration parameters associated with the client device 105. The central device 115 may store configuration parameters associated with the client device 105 and forward the configuration response to the client device 105 (e.g., as a forwarded configuration response 420).

Figure 5:
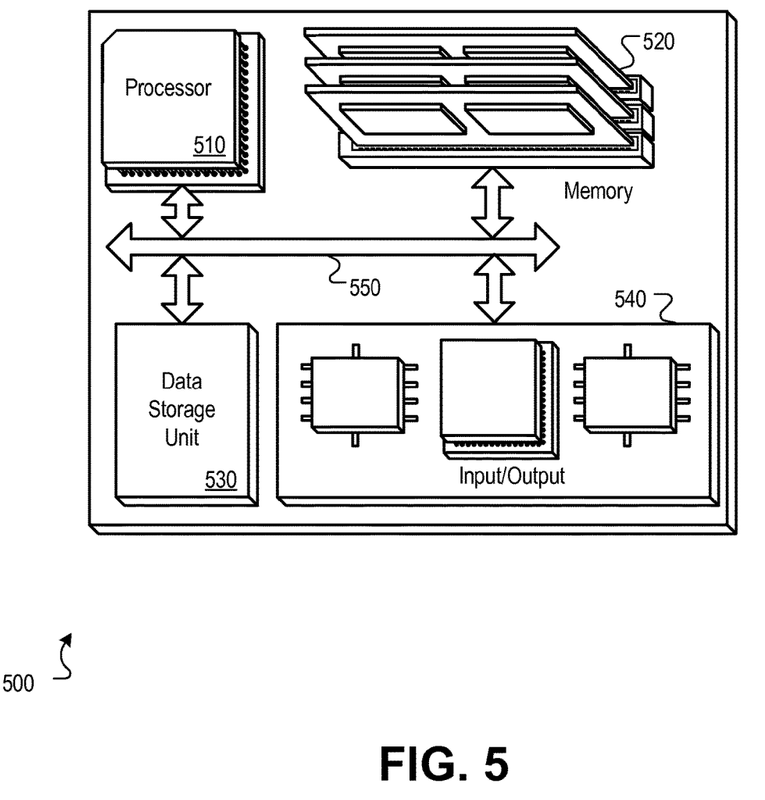
FIG. 5 is a block diagram of a hardware configuration operable to facilitate the identification of a client device associated with a central device.

FIG. 5 is a block diagram of a hardware configuration 500 operable to facilitate the identification of a device associated with a central device. It should be understood that the hardware configuration 500 can exist in various types of devices. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), a wireless interface device (e.g., an 802.11 card), and/or any other device configured to pass communications to and from a client device 105 of FIG. 1. In embodiments, the input/output device can include driver devices configured to send communications to, and receive communications from one or more networks (e.g., local network 110 of FIG. 1, subscriber network 125 of FIG. 1, WAN 120 of FIG. 1, etc.).

Those skilled in the art will appreciate that the invention improves upon methods and apparatuses for identifying client devices connected to a central device. The methods, systems, and computer readable media described herein can be operable to facilitate an association between a recognizable identifier and a client device connecting to a central device. Identification information associated with a client device may be received at a central device within a request for configuration parameters. The identification information may be used to retrieve a recognizable identifier associated with the client device. In embodiments, the client device may be identified within a display using the associated recognizable identifier.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some implementations, multitasking and parallel processing may be advantageous.

I claim:

1. A method comprising:
   receiving a request for configuration parameters from a client device when the client device is connected to a central device, wherein the request comprises identification information associated with the client device, wherein the identification information comprises a preset identifier associated with the client device;
   accessing a table that includes associations between one or more preset identifiers and one or more recognizable identifiers, wherein the table comprises a mapping between two different identifiers associated with each respective one client device of one or more client devices, the two different identifiers comprising a preset identifier associated with the respective one client device and a recognizable identifier associated with the respective one client device;
   from the table, identifying a recognizable identifier associated with the client device by mapping the preset identifier associated with the client device to the recognizable identifier;
   storing the association between the recognizable identifier and the client device; and
   outputting a message comprising the association between the recognizable identifier and the client device, wherein information carried by the message is used in the generation of a display interface, wherein the recognizable identifier associated with the client device is displayed within the display interface, and wherein the recognizable identifier associated with the client device identifies the client device as a device that is connected to the central device.

2. The method of claim 1, wherein retrieving the recognizable identifier comprises:
   parsing the recognizable identifier from the request for configuration parameters.

3. The method of claim 2, wherein the recognizable identifier comprises an identification of a device type associated with the client device.

4. The method of claim 1, wherein retrieving the recognizable identifier comprises:
   mapping the identification information to the recognizable identifier.

5. The method of claim 1, wherein retrieving the recognizable identifier comprises:
   receiving user input of the recognizable identifier.

6. The method of claim 1, wherein storing the association between the recognizable identifier and the client device comprises:
   storing the recognizable identifier within a database comprising one or more configuration parameters associated with the client device.

7. The method of claim 1, wherein the request for configuration parameters comprises a dynamic host configuration protocol request.

8. An apparatus comprising:
   an interface that receives a request for configuration parameters from a client device when the client device is connected to a central device, wherein the request comprises identification information associated with the client device, wherein the identification information comprises a preset identifier associated with the client device;
   a module that:
      accesses a table that includes associations between one or more preset identifiers and one or more recognizable identifiers, wherein the table comprises a mapping between two different identifiers associated with each respective one client device of one or more client devices, the two different identifiers comprising a preset identifier associated with the respective one client device and a recognizable identifier associated with the respective one client device; and
      from the table, identifies a recognizable identifier associated with the client device by mapping the preset identifier associated with the client device to the recognizable identifier;
   storage that stores the association between the recognizable identifier and the client device; and
   an output interface that outputs a message comprising the association between the recognizable identifier and the client device, wherein information carried by the message is used in the generation of a display interface, wherein the recognizable identifier associated with the client device is displayed within the display interface, and wherein the recognizable identifier associated with the client device identifies the client device as a device that is connected to the central device.

9. The apparatus of claim 8, wherein retrieving the recognizable identifier comprises:

parsing the recognizable identifier from the request for configuration parameters.

10. The apparatus of claim 9, wherein the recognizable identifier comprises an identification of a device type associated with the client device.

11. The apparatus of claim 8, wherein retrieving the recognizable identifier comprises:
mapping the identification information to the recognizable identifier.

12. The apparatus of claim 8, wherein retrieving the recognizable identifier comprises:
receiving user input of the recognizable identifier.

13. The apparatus of claim 8, wherein the request for configuration parameters comprises a dynamic host configuration protocol request.

14. One or more non-transitory computer readable media having instructions operable to cause one or more processors to perform the operations comprising:
receiving a request for configuration parameters from a client device when the client device is connected to a central device, wherein the request comprises identification information associated with the client device, wherein the identification information comprises a preset identifier associated with the client device;
accessing a table that includes associations between one or more preset identifiers and one or more recognizable identifiers, wherein the table comprises a mapping between two different identifiers associated with each respective one client device of one or more client devices, the two different identifiers comprising a preset identifier associated with the respective one client device and a recognizable identifier associated with the respective one client device;
from the table, identifying a recognizable identifier associated with the client device by mapping the preset identifier associated with the client device to the recognizable identifier;
storing the association between the recognizable identifier and the client device; and outputting a message comprising the association between the recognizable identifier and the client device, wherein information carried by the message is used in the generation of a display interface, wherein the recognizable identifier associated with the client device is displayed within the display interface, and wherein the recognizable identifier associated with the client device identifies the client device as a device that is connected to the central device.

15. The one or more non-transitory computer-readable media of claim 14, wherein retrieving the recognizable identifier comprises:
parsing the recognizable identifier from the request for configuration parameters.

16. The one or more non-transitory computer-readable media of claim 15, wherein the recognizable identifier comprises an identification of a device type associated with the client device.

17. The one or more non-transitory computer-readable media of claim 14, wherein retrieving the recognizable identifier comprises:
mapping the identification information to the recognizable identifier.

18. The one or more non-transitory computer-readable media of claim 14, wherein retrieving the recognizable identifier comprises:
receiving user input of the recognizable identifier.

19. The one or more non-transitory computer-readable media of claim 14, wherein storing the association between the recognizable identifier and the client device comprises:
storing the recognizable identifier within a database comprising one or more configuration parameters associated with the client device.

20. The one or more non-transitory computer-readable media of claim 14, wherein the request for configuration parameters comprises a dynamic host configuration protocol request.

* * * * *